United States Patent [19]

Serres, Jr.

[11] 4,310,657
[45] Jan. 12, 1982

[54] POLYMERIC MONOHYDROXYBENZENOID HYDROQUINOID ANTIOXIDANTS

[75] Inventor: Carl Serres, Jr., Naperville, Ill.

[73] Assignee: Standard Oil Company (Indiana), Chicago, Ill.

[21] Appl. No.: 51,450

[22] Filed: Jun. 25, 1979

[51] Int. Cl.³ ............... C08G 61/02; C07D 333/76; C07D 333/72; C07D 333/56; C07D 39/14; C07D 39/12; C07D 39/08
[52] U.S. Cl. .................. 528/212; 260/45.85 S; 528/219; 549/43; 549/49; 568/718; 568/719; 568/720
[58] Field of Search .............. 528/212, 219; 549/43, 549/49; 568/718, 719, 720; 260/45.95 B, 45.8 S

[56] References Cited

U.S. PATENT DOCUMENTS

| | | | |
|---|---|---|---|
| 3,128,259 | 4/1964 | Sonnabend | 528/212 |
| 3,137,677 | 6/1964 | Bolgiano | 528/212 |
| 3,251,808 | 5/1966 | Kaupp et al. | 528/212 |
| 3,630,900 | 12/1971 | Van der Voort | 528/212 |
| 4,065,434 | 12/1977 | Rutledge | 528/212 |
| 4,127,564 | 11/1978 | Sanborn | 528/219 |

Primary Examiner—V. P. Hoke
Attorney, Agent, or Firm—William C. Clarke; William T. McClain; William H. Magidson

[57] ABSTRACT

Compositions of oxidizable organic materials having stabilizing amounts of polymeric monohydroxybenzenoid hydroquinoid antioxidants of from about 500 to about 10,000 molecular weight, and the said polymers which are the reaction products of an alpha, alpha' alkyl aromatic compound containing a benzenoid ring, a hydroquinone compound and a monohydroxy benzenoid compound.

10 Claims, No Drawings

POLYMERIC MONOHYDROXYBENZENOID HYDROQUINOID ANTIOXIDANTS

BACKGROUND OF THE INVENTION

This invention relates to stabilization of oxidizable organic materials with polymeric monohydroxybenzenoid hydroquinoids. This invention also relates to polymeric monohydroxybenzenoid hydroquinoids as new chemicals as well as to the oxidative stabilization of foodstuffs, and organic materials subject to the deleterious effects of oxidative deterioration. These monohydroxybenzenoid hydroquinoid compounds are generally useful as antioxidants and age resistors for the preservation of materials which deteriorate in the presence of oxygen and on aging, and are particularly valuable as antioxidants for vegetable oils and fats for edible use. It is theorized that polymeric antioxidant additives of sufficient molecular weight will be unable to pass through the membranes of the gastrointestinal tract when ingested with foods.

Oxidation of fats and oils in consumable (edible) materials is an especial problem as such oxidation can render foodstuffs unpalatable and unfit for consumption. Of the three major components of edible materials which are protein, carbohydrates and lipids (which include fats and oils), lipids, i.e., the fats and oils, are most subject to oxidative degradation.

A variety of materials have been proposed as additives to inhibit undesired oxidation. Typically, these materials have a hydroquinone or phenolic structure. Among those commonly used are butylated hydroxy anisole (BHA) and butylated hydroxy toluene (BHT). BHA and BHT are readily soluble in fats and oils, are considered to be non-toxic and can be used in small quantities to inhibit or retard rancidity. However, the use of BHA and BHT is under attack since upon ingestion with foods these materials pass through the gastrointestinal tract walls into the blood stream and vital organs where their presence and safety to the host body is alleged to be of doubtful consequence. Observed pathological effects, carcinogenic potential, interactions with enzymes and lipids, effects on reproduction (Branen, A. L., J.O.A.C.S. 52:59 (1975)) have indicated the long-term safety of BHA and BHT is at least subject to controversy.

Other important considerations besides toxicity in applying antioxidants to vegetable oils to achieve optimum results are that the antioxidant not contribute an objectionable odor, color or flavor, and have complete solubility in the fats and oils at treatment levels sufficient to obtain good stability results. An increased antioxidant activity with complete solubility permits lower treatment levels. Accordingly, it is becoming recognized that any new approach to the problem of incorporating antioxidant materials in edibles requires a neat balancing of desirable characteristics which cannot be predicted on the basis of chemical structure.

In the prior art, Sommabend, U.S. Pat. No. 3,128,259 teaches the concept of preparing synthetic polymeric resins containing phenolic hydroxyl groups which are further reacted to prepare polyhydric alcohols adapted to prepare drying-oil esters and alkyl resins. Hunter, U.S. Pat. No. 3,424,821 teaches a composition wherein di(secondary alkyl) hydroquinones are reacted with a polymer such as styrene to obtain antioxidants suitable for polymers or vegetable oils. Zaffaroni, U.S. Pat. No. 3,994,828 teaches that fixing an antioxidant phenolic moiety to a polymer molecule of sufficient size to prevent passage through the walls of the gastrointestinal tract provides an antioxidant suitable for substantial nonabsorption from the gastrointestinal tract. Dale et al., U.S. Pat. No. 3,930,047, teaches polymeric phenolic antioxidants which could easily be varied in molecular size to achieve desired nonabsorption through the walls of the intestinal tract. The materials of U.S. Pat. No. 3,930,407 are homopolymers of alpha-(2-hydroxy-3,5-di-lower alkylphenyl) ethylvinyl benzene or alpha-(2-hydroxy-3-lower alkylphenyl)ethylvinyl benzene which exhibited substantial antioxidant activity in fats, oils and other foodstuffs. Dale et al., U.S. Pat. No. 3,996,160, teaches ring polymerized hydroquinoid polymers having antioxidant activity for foods wherein the polymers are prepared from the copolymerization of a diolefinic hydrocarbon, a hydroquinoid and optionally a phenolic. The olefinic hydrocarbon preferably was a divinylbenzene, the hydroquinoid was preferably hydroquinone and other 1,4-dihydroxybenzenes. Suitable phenolic compounds were phenol, cresols, dimethyl, ethyl and butylphenols as well as bisphenol-A. Use of a solvent is indicated in Example IX of U.S. Pat. No. 3,996,160 in a blend of cottonseed and soybean oil, the sample containing 0.5 ml benzene to 50 ml vegetable oil. The phenolic moieties are not of the polymeric chain but attach as separate moieties to the hydroquinone moiety. Wang et al., U.S. Pat. No. 3,996,198 teaches what is essentially a linear polymer prepared from preferably divinylbenzenes, phenolic reactants preferably such as phenol, the cresols, dimethyl ethyl and butyl phenols. The polymer of U.S. Pat. No. 3,996,198, according to the depicted structure, contains one equivalent of aromatic moiety which does not contribute antioxidant activity to the polymer since it is void of functional groups. Use of a solvent is indicated in Example VIII of U.S. Pat. No. 3,996,198 in a blend of cottonseed oil and soybean oil, the sample containing 0.5 ml benzene to 50 ml vegetable oil. Similar compounds for antioxidant use are taught in U.S. Pat. Nos. 3,996,199 and 4,054,676 wherein polymeric antioxidants are prepared from vinylbenzenes, a hydroquinone and certain phenolic compounds.

Accordingly a number of polymeric antioxidants have been prepared which are distinguished by the moieties contained in the polymer molecules, methods of preparation and consequent properties. However, as a rule, many of the antioxidants are not markedly superior in their antioxidant and other properties to BHT and BHA.

Since it was known from the prior art that hydroquinones and phenolic compounds separately have been used as antioxidants in edibles, it was a primary object of this invention to provide a compound with the combined antioxidant properties of both hydroquinone and phenolic compounds which could be utilized to provide antioxidant properties superior to BHT and BHA wherein the molecule was soluble in fats and vegetable oils and was of sufficient molecular size as to achieve non-absorption through the walls of the gastrointestinal tract.

SUMMARY OF THE INVENTION

This invention relates to compositions of oxidizable organic materials having stabilizing amounts of polymeric monohydroxybenzenoid hydroquinoids of high molecular weight and to the said polymers which are the reaction product of an alpha, alpha' alkyl aromatic compound containing a benzenoid ring, a hydroquinone compound and a monohydroxybenzenoid compound.

DETAILED DESCRIPTION OF THE INVENTION

Polymeric monohydroxybenzenoid hydroquinoids of high molecular weight are prepared by an improved process by reacting a hydroxy or halogenated aromatic compound or derivative thereof, a hydroquinone compound and a monohydroxybenzenoid compound. The general equation for the reaction is

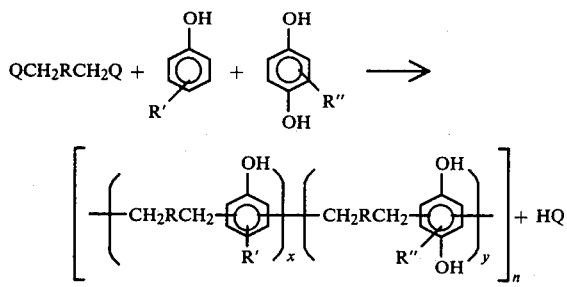

wherein R is a benzenoid ring selected from the group consisting of benzene, naphthalene, biphenyl, diphenyl methane, thiophene, benzothiophene, and dibenzothiophene moieties and wherein the $QCH_2$—groups can be attached to the benzenoid ring in any suitable position, R' and R" are independently selected from the group consisting of hydrogen and an alkyl group of 1 to 26 carbon atoms such as those selected from the group consisting of methyl, ethyl, isopropyl, n-propyl, t- and n-butyl to dodecyl and to hexacosane. Q can be halogen (fluorine, chlorine, bromine, iodine) or hydroxy, or ethers or esters of the hydroxy moiety wherein the alkyl and acyl groups of said ethers and esters are from one to 12 carbon atoms such as methyl to dodecyl and formic to dodecanoic. R' and R" are preferably hydrogen and tertiary butyl respectively. x and y can be of the ratio of 10:1 to 1:10 but preferably are of the ratio of 1:3 to 3:1 and most preferably of the ratio 1:3. n is from 1 to 20 for a molecular weight within the range of from 500 to 10,000.

These compounds can be used as antioxidants in fats and vegetable oils and edible consumables, as well as other organic materials such as polymers, animal and mineral oils, fish oils, gasoline, etc. which are normally subject to deterioration upon exposure to air, heat and light. Fats and vegetable oils and edible consumables include glyceride oils such as corn oil, sunflower oil, cottonseed oil, safflower oil, soybean oil, peanut oil, etc., as well as animal fats such as lard and fish oils such as menhaden and sardine oils. These antioxidants of the present invention can be added to a wide variety of foods such as baked goods, processed canned fruits, vegetables and juices, meat products such as hams, sausage and bacon, and other food products such as essential oils, oil-soluble vitamins, peanut butter, mayonnaise, margarine, as well as milk products such as cheese, butter and so forth. Hydrocarbon polymers, including polyolefins (e.g., polyethylene plastic, cross-linked polyethylene, polypropylene, ethylenepropylene copolymer, etc.), diene polymers such as polybutadiene or polyisoprene homopolymer or copolymers of dienes with copolymerizable monoethylenically unsaturated monomers, e.g., styrene, acrylonitrile, isobutylene, vinyl pyridine, acrylic acid, acrylates, ethylene, propylene, etc., as in butadiene-styrene copolymer, butadiene-acrylonitrile copolymer, isobutylene-isoprene copolymer, ethylene-propylene-diene (e.g., dicyclopentadiene, ethylidene norbornene, methylene norbornene, 1,4-hexadiene, cyclooctadiene, etc.) terpolymers, etc. can be stabilized, using the present chemicals as antioxidants, as can such polymers as polyurethanes, polycarbonates, polyesters, polyvinyl chloride, styrene acrylonitrile resin, ABS polymers, etc. These and other uses will be apparent to those skilled in the art to which the present invention pertains from the following specification.

In oxidizable edible products such as glyceride edible oils, fats, essential oils, nuts, and flavorings, an effective amount of these antioxidant materials is within the range of from about 2 to about 10,000 parts per million by weight, basis oxidizable substance or material, or preferably from about 5 to about 1,000 parts per million by weight. When these antioxidant materials are mixed with plastics, rubbers, gasoline, etc., an effective amount of these antioxidants is within the range of from about 2 to 50,000 parts per million, basis oxidizable substance. In such use, as in plastics and rubbers, these materials offer the advantage of being substantially non-volatile and thus not likely to be lost by migration and/or vaporization.

In general, the hydroxy or halogenated aromatic compounds can be represented by the formula $QCH_2RCH_2Q$ wherein Q is halogen or hydroxy, R is a benzene ring, a naphthalene ring, a biphenyl moiety, a diphenylalkane moiety or a heterocyclic moiety such as a thiophene ring, a benzothiophene moiety or a dibenzothiophene moiety, and wherein the ring moiety can be substituted with substituents such as alkyl groups of 1 to 26 carbon atoms, nitro groups or halogens. Examples of halogenated aromatics are alpha, alpha'-dichloroparaxylene, bis-chloromethyl biphenyl, bis-chloromethyltoluene, bis-chloromethyl naphthalene, bis-chlorodiphenylmethane, 2,2'-bis(4-chlorophenol)-propane, bis-chloromethylthiophene, and bis-chloromethyldibenzothiophene. Preferably, the halogenated aromatic comprises a compound selected from the group consisting of alpha, alpha'-difluoroparaxylene, alpha, alpha'-dichloroparaxylene, alpha, alpha'-dibromoparaxylene and alpha, alpha'-diiodoparaxylene. Examples of hydroxy aromatics and esters and ethers thereof are alpha, alpha'-dihydroxyparaxylene, alpha, alpha'-dimethoxyparaxylene, and alpha, alpha'-diacetoxyparaxylene.

The hydroquinone compounds useful in my invention are hydroquinone, tertiary alkyl hydroquinone compounds such as 2,5-ditertiary butyl hydroquinone; 2,5-ditertiary amyl hydroquinone, and other alkyl and aralkyl substituted 1,4-dihydroxybenzenes wherein the alkyl groups have from 1 to 26 carbons inclusive and the aralkyls have from 7 to 26 carbons inclusive. Suitable hydroquinoid compounds contain at most two such alkyl or aralkyl substituents and at least two replaceable ring hydrogens. Accordingly ring alkylation by the halogenated aromatic hydrocarbon can occur in at least two sites, thereby yielding polymerization in accordance with this invention. Suitable hydroquinonoid reactants include, for example, 1,4-dihydroxybenzene, 2,3- or 2,5- or 2,6-dimethyl-1,4-dihydroxybenzene, 2-ethyl-1,4-dihydroxybenzene, 2-t-butyl-1,4-dihydroxybenzene, 2-methyl-5-t-butyl-1,4-dihydroxybenzene,2-(2-phenylethyl)-1,4-dihydroxybenzene, and 2,4-di(2-(4- vinyl)phenylethyl)-1,4-dihydroxybenzene. Preferred hydroquinonoid reactants include hydroquinone and 1,4-dihydroxybenzenes carrying one lower branched or linear alkyl group of from 1 to 5 carbon atoms. Such preferred materials can be further defined as being in accordance with the following:

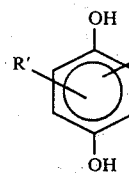

wherein R' is hydrogen and R'' hydrogen or a 1 to 5 carbon atom alkyl. Hydroquinone, 2-methyl-, 2-t-amyl-2-t-butyl-1,4-dihydroxybenzene are most preferred hydroquinonoid reactants. Mixtures of two or more hydroxybenzenoid reactants may be employed.

The monohydroxybenzenoid compounds in my invention have 2 replaceable ring hydrogens. They thus may be represented by the following:

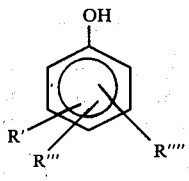

wherein R', R''' and R'''' independently are selected from the group consisting of hydrogen, lower alkyls of from 1 to 26 carbon atoms inclusive and aralkyls of from 7 to 26 carbon atoms inclusive. Examples of monohydroxybenzenoid reactants are phenol, the cresols (i.e., 3- or 4-methylphenol), 3-methyl-4-t-butylphenol, 3- or 4-t-butylphenol, nonylphenol 3- or 4-[1-(4-ethyl)-phenylethyl]1phenol, 3-tert-butyl-(1-phenylethyl)-phenol and the like. Mixtures of such monohydroxybenzenoids can be employed as well. Phenolic naphthalenes can be used as well such as 1-naphthol or 2-naphthol. Dihydroxy naphthalenes can also be used.

Generally, monohydroxybenzenoids wherein R' and R'' are hydrogen and R'''' is hydrogen or a 1 to 26 carbon atom alkyl are preferred with most preferred monohydroxybenzenoids having a long chain alkyl group of 9 to 18 carbon atoms.

The reaction conditions used for synthesizing the desired products and intermediate compounds used for producing the desired products are conventional reaction conditions. These reactions are usually carried out by intimately contacting and reacting the reactants optionally in the presence of a solvent for a time sufficient for them to react, usually about 1 minute to about 60 minutes or longer at reaction temperatures of about −20° C. or less to 200° C. or higher and usually at room temperature of about 25° C. or at slightly elevated temperatures. Generally, stoichiometric amounts of the reactants are reacted under normal atmospheric pressure or at pressures up to 10 atmospheres to produce from the starting reactants the corresponding products. The product is recovered from the reaction vessel by procedures such as the evaporation of the aqueous or organic solvents, by the addition of miscible solvents of low polarity, by chilling the mixture to precipitate the product, and the like.

Representative of acid catalysts suitable for performing the reaction when required herein are p-toluenesulfonic acid, hydrochloric acid, anhydrous hydrobromic acid, sulfuric acid, Lewis acids such as aluminum chloride, boron trifluoride, boron trichloride etherate, boron trifluoride etherate, stannic chloride, titanium tetrachloride and the like.

Accordingly, the invention relates to compositions comprising a polymeric monohydroxybenzenoid hydroquinoid compound and an oxidizable organic material normally subject to adverse effects by oxygen selected from the group consisting of edible fats and oils, polymers, animal and mineral oils and gasoline stabilized against oxidative degradation by having incorporated therein a stabilizing amount of said polymeric monohydroxybenzoid hydroquinoid wherein the said monohydroxybenzenoid hydroquinoid polymer is of a molecular weight ranging from about 500 to about 10,000 and which is a polymer of a hydroxy or halogenated aromatic compound or derivative thereof of the general formula QCH$_2$RCH$_2$Q wherein Q is halogen, hydroxy or derivative thereof and R is a benzene, naphthalene, biphenyl, diphenylmethane, thiophene, benzothiophene or dibenzothiophene moiety, and a hydroquinone compound and a monohydroxybenzenoid compound wherein the said QCH$_2$RCH$_2$Q is reacted with the said hydroquinone compound and said monohydroxybenzenoid compound in stoichiometric mole ratios. Preferably, the QCH$_2$RCH$_2$Q compound mole ratio is considered as one, the combined mole ratio of the hydroquinone and monohydroxybenzenoid compounds is one.

Accordingly the invention also relates to a polymeric monohydroxybenzenoid hydroquinoid compound of the formula

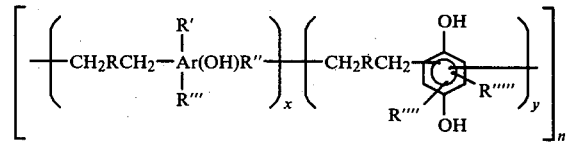

wherein R is a benzenoid ring group selected from the group consisting of benzene, naphthalene, biphenyl, diphenylmethane, thiophene, benzothiophene and dibenzothiophene moieties, and ring substitution products thereof, wherein Ar is a benzenoid ring group selected from the group consisting of phenyl, naphthyl, anthranyl and phenanthranyl groups, having at least two ring hydrogens, and wherein R', R'', R''', R'''', and R''''' are independently selected from a group consisting of hydrogen, alkyls of one to 26 carbon atoms and aralkyls of from 7 to 26 carbon atoms, x and y are of the ratio of from 10:1 to 1:10 and n is an integer of from one to 20. The invention further relates to the compound wherein the said compound is the reaction product of (A) an alpha, alpha' alkyl aromatic compound of the formula QCH$_2$RCH$_2$Q wherein Q is selected from the group consisting of halogen, hydroxy, ethers and esters, the alkyl and acyl groups of said ethers and esters of from one to 12 carbon atoms and R is a benzenoid ring group, (B) a monohydroxybenzenoid compound of the formula H$_2$Ar(OH)R'R''R''' wherein Ar is a benzenoid ring group and R'R''R''' are hydrogen, alkyls or aralkyls and (C) a hydroquinone compound

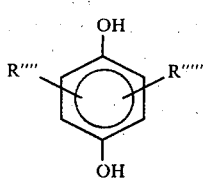

wherein R'''' and R''''' are hydrogen, alkyls or aralkyls and wherein the mole ratio of said alpha, alpha' alkyl aromatic compound to the additive mole ratio of the said monohydroxybenzenoid compound plus the said hydroquinone compound is 1:1.

In another important aspect, the invention is concerned with a method of making the monohydroxybenzenoid hydroquinoids by reacting a mixture of a halogenated aromatic compound, a hydroquinone compound and a monohydroxybenzenoid compound containing at least one alkyl group of one to 26 carbon atoms in the presence of a catalytic amount of an acid catalyst at a temperature of from −20° to 200° C. for a period of from about 1 to about 60 minutes, the compounds being employed in preferably molecular proportions of 1 mole of halogenated aromatic compound to one mole of combined hydroquinone and monohydroxybenzenoid compounds. The polyfunctional characteristics of these compounds require that the molecular proportions preferably be in the ratios cited. An excess of the halogenated (or hydroxy or derivative thereof) compound leads to increased cross-linking which would cause reduced solubility in vegetable oils and fats. An excess of the combined hydroquinone and monohydroxybenzenoid compounds tends to reduce the molecular weight to a level wherein the resulting molecule would pass through the membranes of the gastrointestinal tract when ingested with food.

In order to facilitate a clear understanding of my invention, the following specific embodiments are described in detail. It should be understood, however, that the detailed expositions of the application of this invention, while indicating preferred embodiments, are given by way of illustration only since various changes and modifications within the spirit and scope of this invention will become apparent to those skilled in the art from this detailed description.

EXAMPLE I

A solution of 10.6 g (0.06 moles) alpha,alpha'-dichloro-p-xylene, 5.0 g (0.045 moles) hydroquinone, 1.5 g (0.0158 moles) phenol, and 7.0 aluminum chloride in 240 ml nitrobenzene was stirred at room temperature for 30 min. An equal volume of ether was then added and the resulting solution washed first with dilute aqueous HCl and then washed with water until free of HCl. The ether-nitrobenzene solution was dried over sodium sulfate. The ether was removed by evaporation or distillation and the remaining nitrobenzene solution was poured into n-hexane. This caused precipitation of the polymer product. This product was recovered by filtration and dried.

The effectiveness of the product as an antioxidant for corn oil was tested using the active oxygen method (AOM) for fat stability (American Oil Chemists' Society tentative method Cd12-57). The AOM measures the time in hours required for the oil sample to attain a predetermined peroxide value, usually 100 meq of peroxide per kilogram of oil.

The time required for a sample of corn oil containing 200 ppm of the polymer product to reach 100 meq of peroxide was 19 hrs. A sample of neat corn oil required 16 hrs. The two most widely used commercial antioxidants, butylated hydroxyanisole (BHA) and butylated hydroxytoluene (BHT), gave times of 16 hrs. and 20 hrs. respectively under the same test conditions.

The test antioxidant (200 ppm) is dissolved in a mixture corresponding to 500 ppm of citric acid, 800 ppm propylene glycol and 3,200 ppm glycerol mono-oleate prior to addition to the test oil.

EXAMPLE II

Example I was repeated but using 3.3 g (0.015 moles) p-nonylphenol in place of phenol. The polymer product was further purified by solution in methanol (conc. 2.0%) and re-precipitation into water. The polymer product gave an AOM time of 21 hrs. to 100 meq of peroxide in corn oil.

EXAMPLE III

Example II was repeated but using 4.0 g (0.015 moles) p-dodecylphenol in place of the nonylphenol. The AOM time was 24 hrs.

EXAMPLE IV

Example II was repeated but using 4.6 g (0.015 moles) of 3-n-pentadecylphenol in place of the nonylphenol. The AOM time was 35 hrs. The hydroxyl number (milliequivalents of hydroxyl per gram) of the polymer by acetylation was 5.9 (theo. 6.6). The inherent viscosity at a concentration of 0.4% in N-methyl pyrrolidone as a solvent was equal to approximately 0.1±0.05. The infrared spectrum was consistent with the desired product. Peak average molecular weight was approximately 3500. Elemental anal.; Found: C, 81.8%; H, 7.7%. Theory: C, 82.1%; H, 7.2%.

EXAMPLE V

Example IV was repeated but using 3.3 g (0.03 moles) of hydroquinone and 9.2 g (0.03 moles) of 3-n-pentadecylphenol. The AOM time was 27 hrs.

EXAMPLE VI

Example IV was repeated but using 7.5 g (0.045 moles) of t-butylhydroquinone in place of hydroquinone. The AOM time was 36 hrs.

EXAMPLE VII

Example II was repeated but using 5.2 (0.015 moles) of octadecylphenol in place of nonylphenol. The AOM time was 36 hrs.

EXAMPLE VIII

Polymer prepared as in Example IV was tested in cottonseed oil instead of corn oil. Neat cottonseed oil required 10 hrs. to react 100 meq of peroxide, with 200 ppm of the polymer the time required was 20 hrs.

EXAMPLE IX

The acute oral toxicity of the polymers prepared in Examples IV and VI was determined in rats. No test animals died at levels of 5.0 g/Kg of body weight. The $LD_{50}$ is thus greater than 5.0 g/Kg. Substances with an $LD_{50}$ of 5.0 g are considered non-toxic by the oral route of administration.

What is claimed is:

1. A monohydroxybenzenoid hydroquinoid polymer of the formula

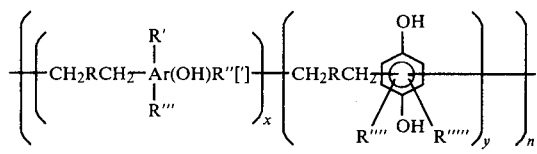

wherein R is a benzenoid ring group selected from the group consisting of benzene, naphthalene, biphenyl, diphenylmethane, thiophene, benzothiophene and dibenzothiophene moieties, wherein Ar is a benzenoid ring group selected from the group consisting of phenyl, naphthyl, anthranyl and phenanthranyl groups, and wherein R' is an alkyl group of 9 to 18 carbon atoms, and R'', R''', R'''' and R''''' are independently selected from a group consisting of hydrogen, alkyls of one to 26 carbon atoms and aralkyls of from 7 to 26 carbon atoms, x and y are of the ratio of from 1:1 to 1:3 and n is an integer of from one to 20.

2. The polymer of claim 1 wherein the said polymer is the reaction product of (A) an alpha, alpha' alkyl aromatic compound of the formula QCH$_2$RCH$_2$Q wherein Q is selected from the group consisting of halogen, hydroxy, ethers and esters, the alkyl and acyl groups of said ethers and esters of from one to 12 carbon atoms, and R is the said benzenoid ring group, (B) a monohydroxybenzenoid compound of the formula H$_2$Ar(OH)R'R''R''' wherein Ar is the said benzenoid ring group and R'R''R''' are the said hydrogen, alkyls and aralkyls and (C) a hydroquinone compound

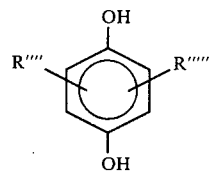

wherein R'''' and R''''' are the said hydrogen, alkyls and aralkyls and wherein the mole ratio of said alpha, alpha' alkyl aromatic compound to the additive mole ratio of the said monohydroxybenzenoid compound plus the said hydroquinone compound is 1:1.

3. The polymer of claim 2 wherein the said alpha, alpha' alkyl aromatic compound is selected from the group consisting of alpha, alpha'-dihalo ortho, meta, and paraxylenes.

4. The polymer of claim 2 wherein the said alpha, alpha' alkyl aromatic compound is selected from the group consisting of alpha, alpha'-dichloroparaxylene, alpha, alpha'-difluoroparaxylene, alpha, alpha'-dibromoparaxylene, alpha, alpha'-diiodoparaxylene, bis-chloromethyl biphenyl, bis-chloromethyltoluene, bis-chloromethylnaphthalene, bis-chloromethylthiophene, bis-chlorodiphenylmethane and bis-chloromethyldibenzothiophene.

5. The polymer of claim 2 wherein the said alpha, alpha' alkyl aromatic compound is alpha, alpha' dichloroparaxylene, the said hydroquinone compound is 1,4-dihydroxybenzene and the said monohydroxybenzenoid compound is selected from the group consisting of, para-nonylphenol, para-dodecyclphenol, 3-n-pentadecyl phenol and octadecyl phenol.

6. The said polymer of claim 5 wherein the said monohydroxybenzenoid compound is para-nonylphenol.

7. The said polymer of claim 5 wherein the said monohydroxybenzenoid compound is para-dodecylphenol.

8. The said polymer of claim 5 wherein the said monohydroxybenzenoid compound is 3-n-pentadecylphenol.

9. The said polymer of claim 5 wherein the said monohydroxybenzenoid compound is octadecylphenol.

10. The said polymer of claim 2 wherein the said alpha, alpha' alkyl aromatic compound is alpha, alpha'-dichloroparaxylene, the said hydroquinone compound is tertiary butylhydroquinone and the said monohydroxybenzenoid compound is 3-n-pentadecylphenol.

* * * * *

UNITED STATES PATENT AND TRADEMARK OFFICE
CERTIFICATE OF CORRECTION

PATENT NO. : 4,310,657
DATED : January 12, 1981
INVENTOR(S) : Carl Serres, Jr.

It is certified that error appears in the above—identified patent and that said Letters Patent is hereby corrected as shown below:

Column 5, lines 19-20, "more hydroxy benzenoid" should read -- more hydroquinonoid --.

Column 7, line 51, "and 7.0" should read -- and 7.0 g --.

Column 8, line 50, "using 5.2" should read -- using 5.2 g --.

Signed and Sealed this

Sixth Day of July 1982

[SEAL]

Attest:

GERALD J. MOSSINGHOFF

Attesting Officer

Commissioner of Patents and Trademarks